United States Patent [19]
Dryden

[11] Patent Number: 6,035,628
[45] Date of Patent: Mar. 14, 2000

[54] PRESSURIZED FLUIDIZED BED COMBUSTION SYSTEM INCLUDING CONTROL OF TEMPERATURE OF FLUE GASES ENTERING A HIGH TEMPERATURE FILTER

[75] Inventor: Richard Dryden, Encinitas, Calif.

[73] Assignee: Foster Wheeler Energia Oy, Helsinki, Finland

[21] Appl. No.: 09/241,854

[22] Filed: Feb. 2, 1999

Related U.S. Application Data

[62] Division of application No. 08/807,805, Feb. 26, 1997, Pat. No. 5,953,898.

[51] Int. Cl.$^7$ ....................................................... F02C 3/26
[52] U.S. Cl. ..................................... 60/39.182; 60/39.464; 55/342.1
[58] Field of Search ............................. 60/39.182, 39.33, 60/39.464; 55/342.1, 342.2, 418.1

[56] References Cited

U.S. PATENT DOCUMENTS

| | | | |
|---|---|---|---|
| 3,203,175 | 8/1965 | Michalička et al. | 60/39.02 |
| 4,380,147 | 4/1983 | Zaba | 60/39.182 |
| 4,474,070 | 10/1984 | Lützke | 73/863.12 |

FOREIGN PATENT DOCUMENTS

| | | |
|---|---|---|
| 0 611 590 | 8/1994 | European Pat. Off. . |
| 0 703 412 | 3/1996 | European Pat. Off. . |
| 2261831 | 6/1993 | United Kingdom . |
| WO 95/32787 | 12/1995 | WIPO . |

*Primary Examiner*—Louis J. Casaregola
*Attorney, Agent, or Firm*—Fitzpatrick, Cella, Harper & Scinto

[57] ABSTRACT

A pressurized fluidized bed combustion system includes a pressure vessel, a furnace section within the pressure vessel for forming high temperature, high pressure gases and for generating steam, a compressor for providing compressed combustion air for the furnace section, a filter for cleaning the high temperature, high pressure flue gases formed in the furnace section, a gas turbine for generating power from the gases formed in the furnace section and cleaned in the filter, a steam turbine cycle for generating power from the steam generated in the furnace section, a heat recovery section, connected to the steam turbine cycle, for recovering heat from the gases exhausted from the gas turbine and for supplying the heat to feedwater provided for the steam generation in the furnace section, and an inlet duct for the filter. The inlet duct is connected between a gas discharge channel in the furnace section and a gas inlet channel in the filter. The inlet duct includes a first gas duct, a second gas duct, a first branch, connecting the gas discharge channel in the furnace section with the first and second gas ducts, for dividing the flow of gases from the furnace section into a first gas flow and a second gas flow, a second branch, connecting the first and second gas ducts with the gas inlet channel in the filter, for recombining the first and second gas flows and a gas cooler in the second gas duct for decreasing temperature of the second gas flow.

29 Claims, 2 Drawing Sheets

PRESSURIZED FLUIDIZED BED COMBUSTION SYSTEM INCLUDING CONTROL OF TEMPERATURE OF FLUE GASES ENTERING A HIGH TEMPERATURE FILTER

This application is a divisional of application Ser. No. 08/807,805, filed Feb. 26, 1997 (U.S Pat. No. 5,953,898).

BACKGROUND AND SCOPE OF THE INVENTION

The present invention relates to a method of operating a flue gas cleaning process and a flue gas filtering system utilizing filters susceptible to damage at temperatures exceeding a characteristic $T_{max}$ for the filters and including means for preventing such damage of the filters. The present invention also refers to a power generation method and a pressurized fluidized bed combustion system utilizing the flue gas filtering system.

The present invention more specifically relates to controlling the temperature of hot gases before leading them to a ceramic filter for particle removal. A need to control the temperature of hot gases exists particularly in combined cycle processes which utilize a pressurized fluidized bed combustor, and when there is a ceramic filter between the combustor and a gas turbine, which ceramic filter is easily damaged, when exposed to too high of temperatures.

In combined cycle processes, solid and liquid fuels can be utilized with high thermal efficiency. Thereby, fuel is combusted at, e.g, a 12–16 bar pressure in a fluidized bed combustor, whereafter the hot flue gases are exhausted from the combustor and allowed to expand in a gas turbine. In order to protect the gas turbine vanes from erosion and fouling, the flue gases are carefully cleaned before being introduced into the gas turbine. The cleaning is typically carried out in a gas purifier system including ceramic filters.

Ceramic filters are very proficient for separating fine solid particles, such as ash and sorbents, from the hot gases. It has, however, turned out that ceramic filters are highly sensitive to too high of gas temperatures at which the crystal structure of the material may change or its bonding agent may deteriorate, resulting in the filters becoming fragile and being broken. This has become a major problem. It is important that precautions are taken to avoid deterioration of ceramic filters, which are very expensive to repair, since the breaking of even a single filter tube in a combined cycle process can cause extensive damage to the gas turbine. Even small damage in the gas filter can be costly, as the whole plant may have to be stopped for removing a single damaged filter element, which easily may take several days.

The manufacturers of ceramic filters today usually state a highest recommended temperature for using the filters, which should—as a minimum precaution—be carefully followed. Typically, the combustion conditions are chosen so that a suitable flue gas temperature is obtained at the filter inlet. It would, however, in many cases be better if additional separate means were available for adjusting the filter inlet temperature. Given the fact that ceramic filter materials technology is still under development and the maximum allowable gas temperature at the inlet of a filter may in many cases be unknown, it would be desirable to have means of controlling the filter inlet temperature with a variable set point.

The thermal efficiency of combined cycle processes, such as pressurized circulating fluidized bed (PCFB) combined cycle processes, improves with increasing combustor flue gas temperatures, i.e., improves when the temperature of flue gases entering the gas turbine is increased. Therefore, it is not economical to cool the flue gases to a too low of a temperature level before introducing them into the ceramic filter. Thus, instead of cooling the flue gases considerably, it is recommendable to adjust the flue gas temperature such that the temperature remains at an as high of a temperature level as possible, but still below temperatures above which the life of the filter material will be significantly shortened or failure could result. These conflicting requirements, related to thermal efficiency and delicacy of the filter material, require that it is essential to maintain the inlet temperature below $T_{max}$, but as close to $T_{max}$ as possible.

The possible fluctuations of the flue gas temperature, which may occur, e.g., due to variations of the fuel quality, make it necessary to leave a temperature margin, when adjusting the temperature of the flue gases. The temperature margin, between the aimed flue gas temperature and the highest recommended inlet temperature of the ceramic filter, has to be of the order of the amplitude of the largest expected temperature fluctuations of the flue gases. As such a temperature margin lowers the thermal efficiency, there is clearly a need for an as accurate and as rapid as possible flue gas temperature control means which can suppress the flue gas temperature fluctuations to 10° F., preferably 5° F. or even less. No such easily controllable adjustment means has until now been available.

British patent GB 2,261,831 discloses a method and an apparatus for protecting ceramic filter elements from sudden temperature variations by using heat storing elements to stabilize the temperature of flue gases before allowing them to come into contact with the ceramic filter elements. This method is not applicable for adjusting the temperature of the flue gases, only for damping its fluctuations.

European patent publication EP 0 611 590 suggests the introduction of an incombustible powder into flue gases prior to filtration, when a rise in flue gas temperature is foreseen. By this method, undesired temperature rises may be suppressed, but as a side effect, clogging of the filtration apparatus is accelerated.

SUMMARY OF THE INVENTION

The object of the present invention is to provide an improved method of operating a flue gas cleaning process and an improved flue gas filtering system, in which the temperature of hot gas at an inlet to a ceramic filter may be adjusted for thus protecting the filter from being exposed to too high of temperatures.

Another object of the present invention is to provide an improved method of operating a flue gas cleaning process and an improved flue gas filtering system for increasing the thermal efficiency of a combined cycle process including a combustor and a ceramic filter while simultaneously maintaining an acceptable inlet temperature for the ceramic filter.

A further object of the present invention is to provide an improved method of operating a flue gas cleaning process and an improved flue gas filtering system for increasing the average flue gas temperature of a combustor in a combined cycle process which includes a ceramic filter downstream from the combustor.

A still further object of the present invention is to provide an improved method of operating a flue gas cleaning process and an improved flue gas filtering system for providing an accurate and rapid control or adjustment of the temperature of hot gases before they are brought into contact with a ceramic filter.

It is also an object of the present invention to provide an improved method of operating a flue gas cleaning process and an improved flue gas filtering system for controlling the flue gas temperature of a combustor with a control procedure having a variable set point, to be used, e.g., in studying the effect of flue gas temperature changes on the durability of ceramic filters.

It is further an object of the present invention to provide an improved power generation method, in a combined PFCB cycle process utilizing ceramic filter elements to clean flue gases prior to the gas turbine, with increased thermal efficiency.

It is still further an object of the present invention to provide an improved pressurized fluidized bed combustion system, which includes ceramic filter elements for flue gas cleaning and in which damage to the ceramic filter elements due to high flue gas temperatures is minimized.

Toward the fulfillment of these and other objects, the method of operating a flue gas cleaning process of the present invention for cleaning high temperature flue gases in a filter, comprises the steps of
 (a) providing a flow of high temperature flue gases to be cleaned;
 (b) dividing said flow of high temperature flue gases into a first flow of flue gases $V_1$ and a second flow of flue gases $V_2$;
 (c) decreasing the temperature of said second flow of flue gases, for providing a cooled flow of flue gases;
 (d) combining said first flow of flue gases and said cooled flow of flue gases, for providing a recombined flow of flue gases, and
 (e) leading said recombined flow of flue gases into said filter.

The temperature of the second flow of flue gases is preferably decreased by passing said second flow of flue gases over heat exchange surfaces in a gas cooler section, e.g., by leading the second flow of flue gases in a vertical path through a duct having vertical heat exchange tubes therein.

The ratio $V_1/V_2$ of the first flow of flue gases $V_1$ to the second flow of flue gases $V_2$ may be controlled by controlling the first flow of flue gases $V_1$ or alternatively by controlling the second flow of flue gases $V_2$. The recombined flow of flue gases may then be adjusted to a temperature in the range $T_{max}$ to ($T_{max}$ minus 30° F.), preferably $T_{max}$ to ($T_{max}$ minus 10° F.), most preferably $T_{max}$ to ($T_{max}$ minus 5° F.), by controlling the ratio $V_1/V_2$ of the first flow of flue gases $V_1$ to the second flow of flue gases $V_2$ or by controlling the temperature of the second flow of flue gases.

An inlet ducting, for a flue gas filtering system utilized for cleaning high temperature flue gases in a filter, such as a ceramic filter, susceptible to damage at temperatures exceeding a characteristic $T_{max}$ for said filter, comprises according to the present invention
 (a) a flue gas channel for providing a flow of high temperature flue gases;
 (b) a first flue gas duct connected to said flue gas channel;
 (c) a second flue gas duct connected to said flue gas channel;
 (d) a first branching connecting said flue gas channel to said first and second flue gas ducts, for dividing said flow of high temperature flue gases into a first and second flue gas flow;
 (e) an inlet channel, for introducing flue gas to said filter;
 (f) a second branching connecting said first and second flue gas ducts to said inlet channel, for recombining said first and second flue gas flows in said inlet channel to a recombined flow of flue gases, and
 (g) gas cooling means in said second flue gas duct, for decreasing the temperature of said second flue gas flow.

The system preferably also includes means for controlling the first and/or second flue gas flow, such as a valve arranged in the first and/or second flue gas duct. A valve arranged in the second flue gas duct is preferably arranged downstream of the gas cooling means therein. The flue gas ducts are preferably mainly vertical and gas cooling means used to decrease the temperature of the flue gas flow preferably includes vertical heat exchange tubes, such as water tubes, arranged parallel with the flue gas flow within the duct.

The system according to the present invention also preferably includes means for measuring the temperature of the recombined flow of flue gases and means for controlling the ratio $V_1/V_2$ of the first flow of flue gases $V_1$ and second flow of flue gases $V_2$, for controlling the temperature of the recombined flow of flue gases, to provide a recombined flow of flue gases having a temperature within a temperature range $T_{max}$ to ($T_{max}$ minus 30° F.), preferably ($T_{max}$ to $T_{max}$ minus 10° F.), most preferably $T_{max}$ to ($T_{max}$ minus 5° F.).

The improved power generation method according to the present invention comprises the steps of
 forming a furnace section in an enclosure;
 fluidizing a bed of combustible material in said furnace section and combusting said combustible material in said furnace section;
 discharging flue gases and fine particulate material entrained therein from said furnace section;
 introducing discharged flue gases and fine particulate material entrained therein into a filter, such as a high temperature ceramic filter;
 separating said fine particulate material from said flue gases in said filter, for cleaning said flue gases;
 passing the thus cleaned flue gases to a power generating section;
 allowing said cleaned gas to expand in a gas turbine in said power generating section, and
 controlling the temperature of flue gases discharged from said furnace section before introducing said flue gases into said filter by
  (a) dividing said flow of high temperature flue gases into a first flow of flue gases $V_1$ and a second flow of flue gases $V_2$;
  (b) decreasing the temperature of said second flow of flue gases in a gas cooler section, for providing a cooled flow of flue gases;
  (c) combining said first flow of flue gases and said cooled flow of flue gases, for providing a recombined flow of flue gases to be introduced into said filter.

According to a preferred power generation method according to the present invention, there is provided a fluid flow circuit including water tubes forming heat exchange surfaces in the gas cooler section and water/steam tubes in said furnace section, absorbing heat from the combustion of combustible material, and a steam turbine for power generation. The feed water for the water/steam tubes in the furnace section is heated in the gas cooler section.

The improved pressurized fluidized bed combustion system according to the present invention comprises:
 a pressure vessel;
 a furnace section within said pressure vessel for forming high temperature high pressure gases and steam;

a compressor for providing compressed combustion air for the furnace section;

a filter for cleaning said high temperature high pressure flue gases formed in the furnace section;

a steam turbine cycle for generating power of said steam formed in the furnace section;

a gas turbine for generating power of high temperature high pressure gases formed in the furnace section and cleaned in the filter;

a heat recovery section, for recovering heat from exhaust gases from the gas turbine, and an inlet ducting for the filter, the inlet ducting being connected between a gas discharge channel in the furnace section and a gas inlet channel in the filter, the inlet ducting further comprising
(a) a first gas duct;
(b) a second gas duct;
(c) a first branching connecting said gas discharge channel in the furnace section with said first and second gas ducts, for dividing said flow of high temperature high pressure gases into a gas flow and a second gas flow;
(d) a second branching connecting said first and second gas ducts with said gas inlet channel in the filter, for recombining said first and second gas flows to a recombined flow of gases, and
(e) gas cooling means in said second gas duct, for decreasing the temperature of said second gas flow.

The present invention is especially applicable in combined cycle processes which utilize a pressurized fluidized bed combustor, when there is a ceramic filter between the combustor and a gas turbine, which ceramic filter is easily damaged when exposed to too high of temperatures.

The present invention provides an easy and reliable way of controlling the temperature of hot flue gases from a combustor or similar hot gas source before introducing the gas into the ceramic filter, while maintaining an as high as possible gas temperature. The hot flue gases from the combustor are, according to a preferred embodiment of the present invention, passed to the ceramic filter through a flue gas duct or channel, which includes a section which is split into a first channel and a second channel, the second channel being parallely connected to the first channel and having heat exchange surfaces therein. The flue gas stream from the combustor is thereby divided—with a controllable division ratio—to two sub-streams, one of which is led through the first channel and the second of which is led through the second channel. The first sub-stream is according to a preferred embodiment of the invention uncooled, whereas the second sub-stream is cooled by heat exchange surfaces in the second channel. The first and second flue gas sub-streams are recombined after the cooling of the second sub-stream. The thus formed recombined gas flow is then led into the ceramic filter to be purified therein before being introduced into the gas turbine.

According to a preferred embodiment of the present invention, the inlet temperature to the ceramic filter is controlled by means of a valve, such as a butterfly valve, controlling the division ratio of the flue gases between the first channel and the second channel. The butterfly valve may be inserted in the first channel for controlling the flow of uncooled flue gases or in the second channel for controlling the flow of cooled flue gases. Either way the ratio of uncooled to cooled flue gas flow and thereby the temperature of the recombined gas flow may be controlled.

It would according to another embodiment of the present invention be possible to control the temperature of the recombined gas flow by controlling the heat exchange in the second channel.

The temperature of the recombined flue gas flow is according to the preferred embodiment of the present invention adjusted by measuring the temperature of the flue gases entering the ceramic filter and then adjusting the division ratio of the flue gas stream such that the temperature of the recombined flue gas flow meets the predetermined temperature, e.g., $T_{max}$ to ($T_{max}$ minus 30° F.), preferably $T_{max}$ to ($T_{max}$ minus 10° F.), most preferably within about $T_{max}$ to ($T_{max}$ minus 5° F.), where $T_{max}$ is the maximum temperature allowed for gas entering the ceramic filter.

The means for controlling the temperature of gas at the inlet to the ceramic filter thereby according to the preferred embodiment of the invention also includes temperature measuring means, such as a thermometer, for measuring the temperature of the flue gases entering the ceramic filter and controlling means, for controlling the butterfly valve and thereby the divisional ratio of flue gas flows through different channels on the basis of the measured flue gas temperature.

The heat exchange surfaces in the second channel act according to a preferred embodiment of the present invention as final feed water heaters heating feed water for the steam drum connected to the boiler (combustor) steam/water system. Feed water from the steam turbine condenser is typically heated in the gas turbine's exhaust gas heat recovery section before being passed through the final feed water heater, i.e., the flue gas cooler, into the steam drum. The feed water may additionally be passed through an air heater located between the gas turbine's heat recovery section and the gas cooler for heating the combustion air.

The changing of the set point for gas temperature at the ceramic filter inlet does not in this arrangement according to the present invention substantially affect the feed water temperature, as an increase in water heating at the ceramic filter inlet leads to a simultaneous decrease in gas temperature and a decrease in heat recovery at the gas turbine's heat recovery section, and on the other hand a decrease in water heating at the ceramic filter inlet leads to a simultaneous increase in gas temperature and an increase in heat recovery at the gas turbine's heat recovery section.

Therefore, by utilizing the present invention, the flue gases to be led to the ceramic filter can be maintained at an optimal temperature, i.e., without substantially affecting the steam generation and without damaging the ceramic filter tubes.

BRIEF DESCRIPTION OF THE DRAWINGS

The above brief description, as well as objects, further features and advantages of the present invention will be more fully appreciated by reference to the following detailed description of the presently preferred but nonetheless illustrative embodiments of the present invention when taken in conjunction with the accompanying drawings wherein.

DESCRIPTION OF THE PREFERRED EMBODIMENTS

Figure 1:
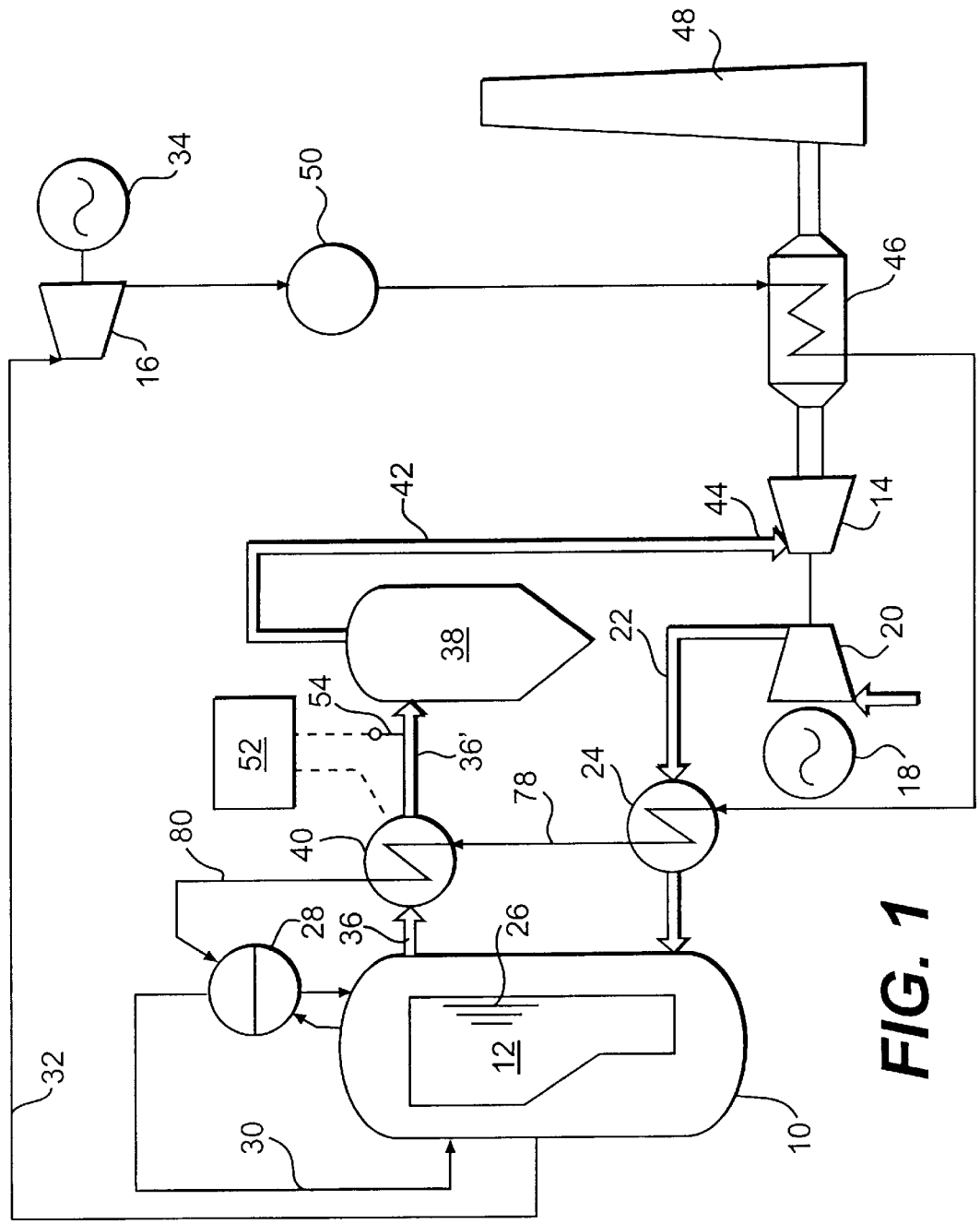
FIG. 1 is a schematic representation depicting a typical arrangement of a combined cycle process with a pressurized combustor in accordance with the present invention.

FIG. 1 schematically illustrates a power plant which is designed to operate on coal or the like fuel and comprises combined steam and gas cycles. The illustrated system includes a pressure vessel 10 with a pressurized circulating fluidized bed combustor (PCFB) or boiler 12 therein. The PCFB combustor produces hot pressurized gas, which is used to generate power in a gas turbine 14, and steam which is used to generate power in a steam turbine 16.

The gas turbine 14 runs a generator 18 for generating electrical power and a compressor 20 for supplying pressurized air to the PCFB combustor 12 by way of a supply line 22. An air heater 24 is provided for heating the air before introduction of it into the pressurized vessel 10. From the vessel, air is fed into the combustor 12 through the bottom thereof for fluidizing the bed therein and for providing combustion air.

The walls of the combustor 12 are typically water tube walls, lined with evaporating tubes 26 converting water to steam. Feed water is introduced to the tubes via a steam drum 28 connected to the upper part of the combustor. Steam generated in the tubes is recirculated to the steam drum, whereafter steam is conducted via line 30 to the combustor for superheating in means not shown. Superheated steam is passed through line 32 to the steam turbine 16. The steam turbine 16 runs a generator 34 which generates electrical power.

A mixture of coal or other fuel and limestone or other sorbents is fed into the combustor and maintained in a fluidized state by means of the compressed air, which is supplied thereto from the compressor 20. As the fuel is burned, hot flue gases are produced. Larger particles entrained in the hot flue gases are usually first separated in a particle separator (not shown in detail) whereafter the partly purified hot flue gases pass through a conduits 36 and 36' to a ceramic filter 38. A flue gas inlet temperature controller 40 is provided in the conduit 36' prior to the ceramic filter 38. The temperature controller allows the set point for the desired flue gas temperature to be adjusted according to need. The ceramic filter 38 removes substantially all remaining fine particles from the hot flue gases and passes the cleaned hot gases along a gas line 42 to the inlet 44 of the gas turbine.

The gas turbine 14 is connected to a heat recovery section 46, where heat is recovered from the gas turbine exhaust gases the gases before are exhausted through the stack 48.

A steam condenser 50 is connected to the steam turbine 16 outlet for providing feed water. The feed water is heated in the heat recovery section 46 before being cooled in the air heater 24 and re-heated in the hot gas inlet temperature controller 40 and recirculated to the steam drum 28.

Control means 52 is connected to an appropriate temperature monitoring means 54, such as a thermometer, for monitoring the temperature of the hot flue gases in line 36' between the temperature controller 40 and the ceramic filter 38. The control means 52 is further connected to a means (not shown in FIG. 1) for controlling the flue gas division ratio within the inlet temperature control system of the ceramic filter 38. The construction of the temperature control system is shown in more detail in FIGS. 2 and 3.

Figure 3:
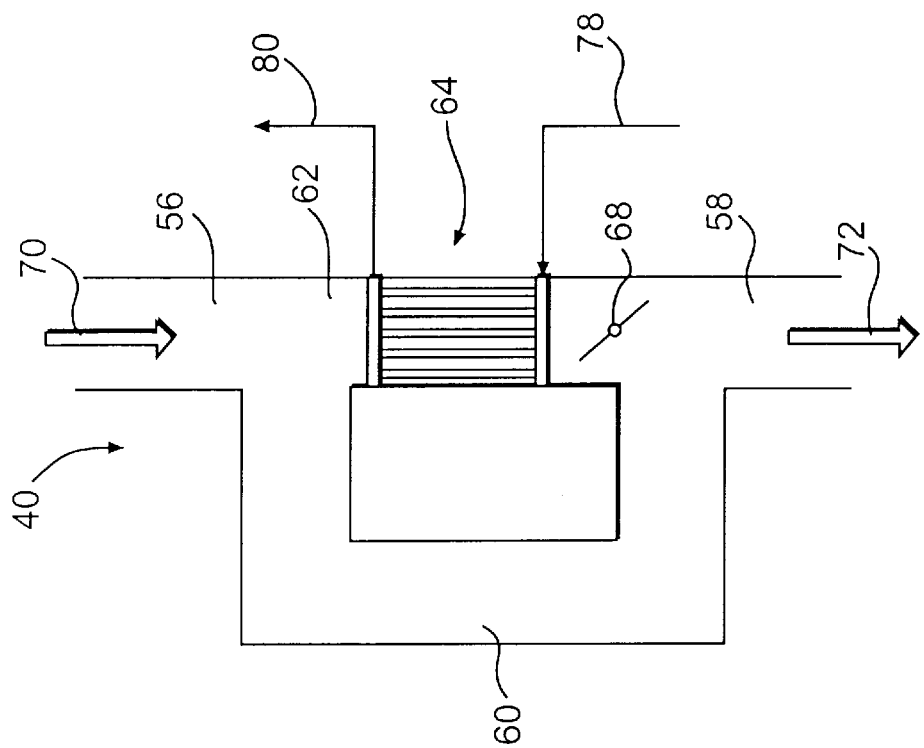
FIG. 3 is a schematic representation depicting a vertical cross section of an inlet channel according to another embodiment to the present invention.
Figure 2:
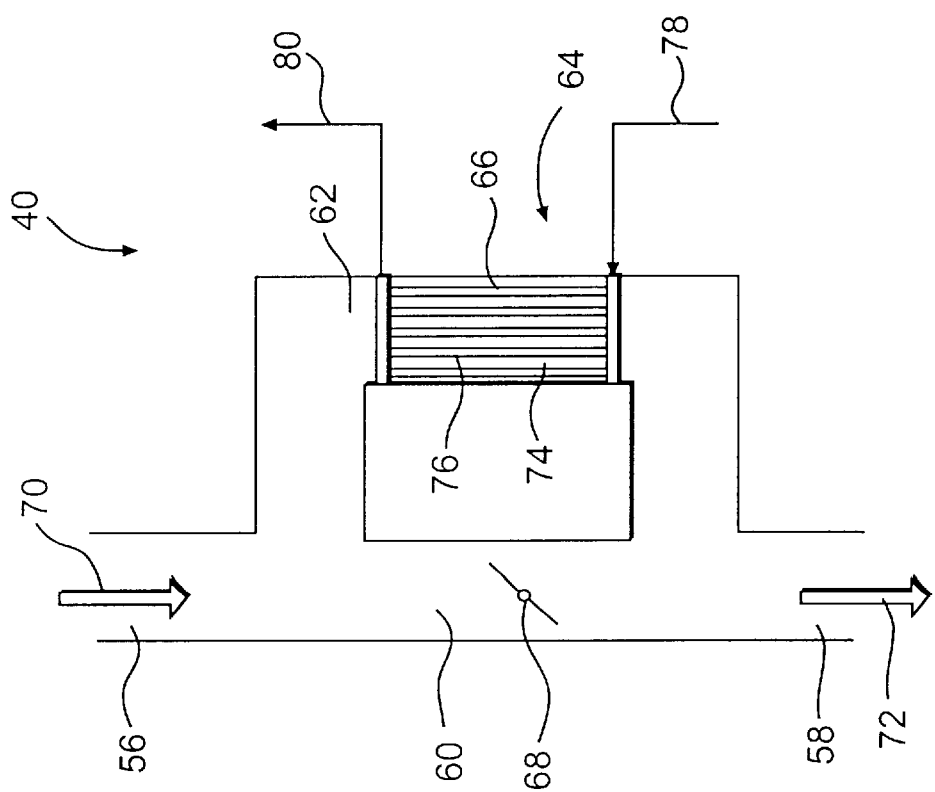
FIG. 2 is a schematic representation depicting a vertical cross section of an inlet channel to a ceramic filter according to an embodiment of the present invention.

FIGS. 2 and 3 provide a schematic illustration of two embodiments of the flue gas inlet temperature controller 40 according to the invention. The same reference numerals are used in FIGS. 2 and 3 where applicable.

The inlet temperature controller 40 includes an inlet duct 56 from conduit 36, in gas flow communication with the combustor 12, and an outlet duct 58 to conduit 36' in gas flow communication with the ceramic filter 38. The temperature control system 40 further comprises two parallel gas channels 60 and 62. Channel 62 includes a gas cooler section 64 with heat exchange surfaces 66. In the embodiment shown in FIG. 2, the channel 60 includes means 68 for controlling the gas flow through this channel and thereby controlling the division ratio of the flue gas flows between the two channels. The means 68 for controlling the gas flow through channel 60 may be a valve, such as a butterfly valve, or any other suitable means for providing a variable flow resistance in said channel.

In the embodiment shown in FIG. 3, the corresponding means 68 is located in channel 62 downstream of the gas cooler section 64. It may be necessary to arrange a flow restrictor in channel 60, or some other means in the inlet ducting, for accomplishing a gas flow through both channels 60 and 62.

A hot flue gas flow 70 from the combustor 12 (shown in FIG. 1) flows through the inlet duct 56 into the temperature controller system and a hot flue gas flow 72, however, in most cases, having a slightly lower temperature is discharged via the outlet channel 58. The temperature of the discharged gas flow 72 is adjusted in the temperature controller to a desired level, close to the maximum temperature level allowed to pass into the ceramic filter.

Typically, the method and system according to the present invention should be capable of controlling a filter inlet gas temperature by several tens of degrees Fahrenheit in a time scale of some tens of seconds, e.g., the system may decrease or increase a flue gas temperature with>10° F., preferably>30° F., or even>60° F. in about 10 to 30 seconds. Commercial ceramic filter materials are currently available with a highest recommended operation temperature of about 1650° F. A typical set point for the flue gas at the ceramic filter inlet is currently somewhat below 1650° F. but will most probably in the future be above 1650° F.

The temperature of the gas flow 72 at the outlet 58, i.e., of the gas flowing into the ceramic filter inlet, can be regulated by adjusting the position of the butterfly valve 68. This adjustment provides a change in the percentage of gas flowing over the heat exchange surface 66 in channel 62 and a change in the temperature of the recombined flow of gas.

The heat exchange surfaces 66 comprise one or more vertical gas flow paths 74 over vertical water tubes 76, the vertical surfaces 66 and flow paths 74 preventing fine solid particles from accumulating on heat exchange surfaces. Thus, a need for soot blowers in the pressurized environment is eliminated.

In FIGS. 2 and 3, the flue gas cooler is described as having water flowing inside heat transfer tubes 76 and gas on the outside thereof, which may be the preferred solution for high pressure steam cycles. A "fire-tube" design, with the flue gas flowing through tubes, which are arranged in a tube package covered by a shell or jacket, and the water flowing between the tubes inside the shell or jacket, may be a more preferred solution in low pressure steam cycles.

A feed water inlet pipe 78 and a feed water outlet pipe 80 are connected to the gas cooler section 64. The feed water inlet pipe 78 is, as shown in FIG. 1, connected through the air heater 24, heat recovery section 46 and condenser 50 to the steam turbine 16 outlet side. The feed water outlet pipe 80 is on the other hand connected to the steam drum 28.

The gas cooler section 64 and the means 68 for controlling the division ratio of gas flow between the two channels 60, 62 may be located in different channels, as shown in FIG. 2, or in the same channel, as shown in FIG. 3.

If the flow division controlling means 68 and the gas cooling means 64 are located in the same channel 62, as shown in FIG. 3, then the division controlling means 68 should preferably be located downstream of the gas cooler section 64, for preventing the division controlling means from being contacted with flue gases at their highest temperatures.

The area of the heat exchange surfaces in the gas cooler section 64 has to be designed such that the flue gas stream can, at all times, be cooled with sufficient efficiency, i.e., to be able to suppress all harmful temperature fluctuations of the flue gases. The maximum control range of the system is obtained when the ratio of the flue gases coming into contact with the heat exchange surfaces can be varied from zero to one. In this respect, the best possible result is obtained by having a controllable flow impedance, such as a butterfly valve, in both of the parallel channels 60 and 62.

The inlet temperature controller 40 may be located within the main pressure vessel 10 of the fluidized bed combustor or on the outside thereof.

There is no intention to limit the invention to the above exemplary embodiments, but on the contrary, it is intended to be applied and modified within the scope of protection defined in the accompanying patent claims.

I claim:

1. A pressurized fluidized bed combustion system comprising:
    a pressure vessel;
    a furnace section within said pressure vessel for forming high temperature, high pressure gases and for generating steam;
    a compressor for providing compressed combustion air for said furnace section;
    a filter for cleaning the high temperature, high pressure flue gases formed in said furnace section;
    a gas turbine for generating power from the high temperature, high pressure gases formed in said furnace section and cleaned in said filter;
    a steam turbine cycle for generating power from the steam generated in said furnace section;
    a heat recovery section, connected to said steam turbine cycle, for recovering heat from gases exhausted from said gas turbine and for supplying the heat to feedwater provided for the steam generation in said furnace section; and
    an inlet duct for said filter, said inlet duct being connected between a gas discharge channel in said furnace section and a gas inlet channel in said filter, said inlet duct comprising (i) a first gas duct, (ii) a second gas duct, (iii) a first branch, connecting said gas discharge channel in said furnace section with said first and second gas ducts, for dividing the flow of high temperature, high pressure gases from said furnace into a first gas flow and a second gas flow, (iv) a second branch, connecting said first and second gas ducts with said gas inlet channel in said filter, for recombining the first and second gas flows into a recombined flow of gases; and (v) gas cooling means, in said second gas duct, for decreasing the temperature of the second gas flow.

2. A pressurized fluidized bed combustion system according to claim 1, further comprising a heat exchanger connected to said steam turbine cycle between said heat recovery section and said furnace.

3. A pressurized fluidized bed combustion system comprising:
    a pressure vessel;
    a fluidized bed boiler within said pressure vessel for combusting combustible material and for forming high temperature, high pressure gases;
    a filter for cleaning the high temperature, high pressure gases formed in said fluidized bed boiler; and
    an inlet duct, connected between a gas discharge channel of said fluidized bed boiler and a gas inlet channel of said filter, for leading a flow of the high temperature, high pressure gases from said fluidized bed boiler to said filter, said inlet duct comprising (i) a first gas duct, (ii) a second gas duct, (iii) a first branch, connecting said gas discharge channel with said first and second gas ducts, for dividing the flow of high temperature, high pressure gases from said fluidized bed boiler into a first flow and a second flow of gases, (iv) a second branch, connecting said first and second gas ducts with said gas inlet channel of said filter, for recombining the first and second flows of gases into a recombined flow of gases, and (v) gas cooling means, in said second gas duct, for decreasing the temperature of the second gas flow.

4. A pressurized fluidized bed combustion system according to claim 3, further comprising temperature monitoring means, in the gas inlet channel of said filter, for monitoring the temperature of the recombined flow of said high temperature, high pressure gases prior to entry into said filter.

5. A pressurized fluidized bed combustion system according to claim 3, further comprising control means for controlling the division of the flow of high temperature, high pressure gases from said fluidized bed boiler into a first flow and a second flow of gases.

6. A pressurized fluidized bed combustion system according to claim 5, wherein said control means comprises means for controlling the gas flow in said first gas duct.

7. A pressurized fluidized bed combustion system according to claim 6, wherein said means for controlling the flow in said first duct comprises a valve.

8. A pressurized fluidized bed combustion system according to claim 5, wherein said control means comprises means for controlling the gas flow in said second gas duct.

9. A pressurized fluidized bed combustion system according to claim 8, wherein said means for controlling the flow in said second gas duct comprises a valve.

10. A pressurized fluidized bed combustion system according to claim 9, wherein said valve is arranged downstream of said gas cooling means.

11. A pressurized fluidized bed combustion system according to claim 3, wherein said second gas duct is a generally vertical duct and said gas cooling means comprises vertical heat exchange tubes arranged parallel to the gas flow within said vertical second gas duct.

12. A pressurized fluidized bed combustion system according to claim 11, wherein said heat exchange tubes comprise water tubes.

13. A pressurized fluidized bed combustion system comprising:
    a furnace section for fluidizing a bed of combustible material to combust the combustible material in said furnace section;
    a discharge for discharging a flow of high temperature flue gases and fine particulate material entrained therein from said furnace section;

a flue gas temperature controller for controlling the temperature of flue gases and fine particulate material entrained therein discharged from said furnace section by said discharge;

a duct for introducing the flow of high temperature flue gases and the fine particulate material into said flue gas temperature controller;

a gas flow divider, in said duct, for dividing the flow of high temperature flue gases and the fine particulate material into a first flow of flue gases $V_1$, and a second flow of flue gases $V_2$ in said flue gas temperature controller;

a gas cooler section for decreasing the temperature of the second flow of flue gases in said flue gas temperature controller, to provide a cooled flow of flue gases;

a combining duct for combining the first flow of flue gases and the cooled flow of flue gases in said flue gas temperature controller to provide a recombined flow of flue gases;

a high temperature ceramic filter for filtering the recombined flow of flue gases and the fine particulate material entrained therein;

an inlet for introducing the recombined flow of flue gases and the fine particulate material entrained therein into said high temperature ceramic filter;

means for measuring the temperature of the hot flue gases and the fine particulate material at a position prior to entry into said filter; and a controller for controlling the temperature of the flue gases entering said filter by adjusting the flow of high temperature flue gases and the fine particulate material in said flue gas temperature controller, on the basis of the temperature measured by said measuring means.

14. A pressurized fluidized bed combustion system according to claim 13, further comprising (i) a separator for separating the fine particulate material from the flue gases in said filter to clean the flue gases and (ii) a turbine supply for passing the thus cleaned flue gases to a gas turbine in a power generating section to cause the cleaned flue gases to expand in the gas turbine.

15. A pressurized fluidized bed combustion system according to claim 13, further comprising means for decreasing the temperature of the second flow of flue gases in said flue gas temperature controller by passing the second flow of flue gases through a gas cooler section having a plurality of aligned heat exchange surfaces therein.

16. A pressurized fluidized bed combustion system according to claim 15, further comprising a fluid flow circuit that includes (i) water tubes, which form the heat exchange surfaces in said gas cooler section, (ii) tubes in said furnace section, which absorb heat from the combustion of the combustible material, and (iii) at least one steam turbine, which generates power.

17. A pressurized fluidized bed combustion system according to claim 16, wherein feed water in the tubes in said furnace section absorbs heat in said gas cooler section after having been heated in a heat recovery section arranged in a gas flow downstream of a gas turbine.

18. A pressurized fluidized bed combustion system according to claim 13, wherein said controller further comprises means for controlling the ratio $V_1/V_2$ of the first flow of flue gases $V_1$ to the second flow of flue gases $V_2$ by controlling the flow rate of at least one of the first flow of flue gases $V_1$ and the second flow of flue gases $V_2$ in said flue gas temperature controller.

19. A pressurized fluidized bed combustion system according to claim 13, further comprising regulating means for regulating the temperature of the recombined flow of flue gases to a temperature in a range of $T_{max}$ to ($T_{max}$ minus 30° F.), wherein $T_{max}$ is the maximum temperature allowed for gas entering the filter.

20. A pressurized fluidized bed combustion system according to claim 19, wherein said regulating means comprises means for controlling the ratio $V_1/V_2$ of the first flow of flue gases $V_1$ to the second flow of flue gases $V_2$ in said flue gas temperature controller.

21. A pressurized fluidized bed combustion system according to claim 19, wherein said regulating means comprises means for controlling the temperature of the second flow of flue gases in said flue gas temperature controller.

22. A pressurized fluidized bed combustion system according to claim 13, further comprising regulating means for regulating the temperature of the recombined flow of flue gases to a temperature in a range of $T_{max}$ to ($T_{max}$ minus 10° F.), wherein $T_{max}$ is the maximum temperature allowed for gas entering the filter.

23. A pressurized fluidized bed combustion system according to claim 22, wherein said regulating means comprises means for controlling the ratio $V_1/V_2$ of the first flow of flue gases $V_1$ to the second flow of flue gases $V_2$ in said flue gas temperature controller.

24. A pressurized fluidized bed combustion system according to claim 22, wherein said regulating means comprises means for controlling the temperature of the second flow of flue gases in said flue gas temperature controller.

25. A pressurized fluidized bed combustion system according to claim 13, further comprising regulating means for regulating the temperature of the recombined flow of flue gases to a temperature in a range of $T_{max}$ to ($T_{max}$ minus 5° F.) wherein $T_{max}$ is the maximum temperature allowed for gas entering the filter.

26. A pressurized fluidized bed combustion system according to claim 25, wherein said regulating means comprises means for controlling the ratio $V_1/V_2$ of the first flow of flue gases $V_1$ to the second flow of flue gases $V_2$ in said flue gas temperature controller.

27. A pressurized fluidized bed combustion system according to claim 25, wherein said regulating means comprises means for controlling the temperature of the second flow of flue gases in said flue gas temperature controller.

28. A pressurized fluidized bed combustion system according to claim 14, wherein said gas turbine drives an air compressor.

29. A pressurized fluidized bed combustion system according to claim 28, wherein said compressor compresses air, and further comprising a supply for supplying the compressed air to said furnace section to support combustion of the combustible material.

* * * * *